United States Patent
Song

(10) Patent No.: US 12,431,761 B2
(45) Date of Patent: Sep. 30, 2025

(54) BALANCE WEIGHT FOR ELECTRIC COMPRESSOR MOTOR AND MANUFACTURING METHOD THEREOF

(71) Applicant: Yeong Guk Song, Goyang-si (KR)

(72) Inventor: Yeong Guk Song, Goyang-si (KR)

( * ) Notice: Subject to any disclaimer, the term of this patent is extended or adjusted under 35 U.S.C. 154(b) by 297 days.

(21) Appl. No.: 18/020,562

(22) PCT Filed: Aug. 10, 2021

(86) PCT No.: PCT/KR2021/010549
§ 371 (c)(1),
(2) Date: Feb. 9, 2023

(87) PCT Pub. No.: WO2022/035175
PCT Pub. Date: Feb. 17, 2022

(65) Prior Publication Data
US 2023/0353012 A1 Nov. 2, 2023

(30) Foreign Application Priority Data

Aug. 10, 2020 (KR) .......................... 10-2020-0099748

(51) Int. Cl.
*H02K 7/04* (2006.01)
*B22F 3/16* (2006.01)
(Continued)

(52) U.S. Cl.
CPC .................. *H02K 7/04* (2013.01); *B22F 3/16* (2013.01); *B22F 3/24* (2013.01); *C22C 9/04* (2013.01); *F25B 31/026* (2013.01); *H02K 15/165* (2013.01); *B22F 2301/10* (2013.01); *B22F 2301/20* (2013.01); *B22F 2301/35* (2013.01); *B22F 2304/10* (2013.01)

(58) Field of Classification Search
CPC ......... H02K 7/04; H02K 15/165; B22F 3/16; B22F 3/24; B22F 2301/10; B22F 2301/20; B22F 2301/35; B22F 2304/10; C22C 9/04; F25B 31/026
See application file for complete search history.

(56) References Cited

U.S. PATENT DOCUMENTS 6,045,601 A * 4/2000 Tan ........................ H01H 1/021
419/37
2012/0301299 A1 11/2012 Sherrill et al.
(Continued)

FOREIGN PATENT DOCUMENTS

JP 2001-012554 A 1/2001
JP 2001-041290 A 2/2001
(Continued)

*Primary Examiner* — Forrest M Phillips
(74) *Attorney, Agent, or Firm* — Bridgeway IP Law Group, PLLC; Jihun Kim

(57) ABSTRACT

A balance weight for an electric compressor motor according to an embodiment may include a main weight material and a specific gravity-adjusting material. The balance weight for an electric compressor motor of the present invention can implement the required specific gravity by changing the content of the specific gravity-adjusting material and can adjust the size by increasing the specific gravity, which is advantageous for miniaturization, allowing for improvement in motor design, and expanding the range of applicable devices.

5 Claims, 3 Drawing Sheets

ISOMETRIC VIEW

SECTION VIEW A'-A'

(51) Int. Cl.
*B22F 3/24* (2006.01)
*C22C 9/04* (2006.01)
*F25B 31/02* (2006.01)
*H02K 15/165* (2025.01)

(56) References Cited

U.S. PATENT DOCUMENTS

| | | | |
|---|---|---|---|
| 2016/0223018 A1* | 8/2016 | Ito | F04D 29/047 |
| 2016/0301279 A1* | 10/2016 | Ito | H02K 5/16 |
| 2019/0190358 A1* | 6/2019 | Perigo | H02K 3/345 |
| 2022/0310319 A1* | 9/2022 | Nozawa | H01F 41/0293 |
| 2025/0030324 A1* | 1/2025 | Koch | H02K 15/165 |

FOREIGN PATENT DOCUMENTS

| | | | |
|---|---|---|---|
| KR | 10-2005-0017849 A | 2/2005 | |
| KR | 10-2007-0040691 A | 4/2007 | |
| KR | 10-2016-0081781 A | 7/2016 | |

\* cited by examiner

BALANCE WEIGHT FOR ELECTRIC COMPRESSOR MOTOR AND MANUFACTURING METHOD THEREOF

TECHNICAL FIELD

The present invention relates to a balance weight for an electric compressor motor and a manufacturing method thereof.

BACKGROUND ART

A balance weight is a component that balances the weight of a mechanical device, and is especially used for dynamic devices such as motors and wheels, and is widely used, for example, in electric vehicles, washing machines, elevators, and air conditioners.

Typically, cooling devices such as air conditioners and refrigerators are equipped with compressors for reducing a refrigerant to a liquid phase, and due to the characteristics of the compressors, they use a motor capable of high-speed rotation with a large toque. Here, a balance weight is required to prevent vibration caused by weight deviation during the rotation of the rotator.

Conventionally, lead (Pb) has been used as a material for balance weights, but despite its ease of processing, lead is not widely used recently because of its harmfulness to the human body and it also has a problem that corrosion may occur over a long period of use.

In addition, in Korean Patent Publication No. 10-2005-0017849, brass was used as a material for the balance weight, but there was a limit to miniaturization because the specific gravity could not be increased beyond brass.

Meanwhile, as a balance weight manufacturing method that has been mainly used in the past, die-casting, which is characterized by melting metal material and injecting it into a metal mold under high pressure, is advantageous in terms of obtaining true density, but has the disadvantage of requiring, because of low precision of the dimension, additional cutting process for precise dimension, incurring high processing costs. In addition, with the recent development of processing technology, it can be made by processing a round bar and can be manufactured through forging and processing processes, but this method has the disadvantage of a lot of material loss and high manufacturing cost.

In addition, there are cases in which cutting processing is used, but this has the disadvantage of high processing costs.

In order to manufacture a balance weight that meets the economic needs while fitting the various sizes of modern devices, it is necessary to develop a technology that can adjust the specific gravity as needed while having a high specific gravity characteristic compared to existing balance weights.

DOCUMENTS OF RELATED ART (Patent Document 1) Korean Patent Publication No. 10-2005-0017849

DISCLOSURE

Technical Problem

It is a technical object of the present invention to provide a balance weight for an electric compressor motor capable of realizing a desired specific gravity and a manufacturing method thereof.

The technical objects of the present invention are not limited to the aforesaid, and other objects not described herein with be clearly understood by those skilled in the art from the descriptions below.

Technical Solution

In order to achieve the above technical object, an embodiment of the present invention provides a balance weight for an electric compressor motor.

Balance weight for an electric compressor motor according to an embodiment of the present invention may include a main weight material and a specific gravity-adjusting material.

According to an embodiment of the present invention, the main weight material may include brass, pure copper, or iron.

According to an embodiment of the present invention, the specific gravity-adjusting material may include tungsten (W), molybdenum (Mo), or tungsten carbide (WC).

According to an embodiment of the present invention, the main weight material may be brass and the specific gravity adjusting material may be tungsten, the balance weight may contain the tungsten of 10 wt % or more in the total weight and have a specific gravity of 8.5 or greater.

In order to achieve the above technical object, an embodiment of the present invention provides a method of manufacturing a balance weight for an electric compressor motor.

According to an embodiment of the present invention, a method of manufacturing a balance weight for an electric compressor motor may include selecting a main weight material and a specific gravity-adjusting material to have a target specific gravity, forming a mixed powder by mixing specific gravity-adjusting material powder and main weight material powder, forming a sintered body by performing pressure-molding and sintering on the mixed powder, and re-pressing the sintered body.

According to an embodiment of the present invention, the main weight material may include brass, pure copper, or iron.

According to an embodiment of the present invention, the specific gravity-adjusting material may include tungsten (W), molybdenum (Mo), or tungsten carbide (WC) in response to the target specific gravity being set higher than the specific gravity of the main weight material.

According to an embodiment of the present invention, the main weight material powder may have an average particle size of 10 μm to 140 μm.

According to an embodiment of the present invention, the specific gravity-adjusting material powder may have an average particle size of 10 μm to 100 μm.

According to an embodiment of the present invention, the method may further include granulating the specific gravity-adjusting material powder in response to an average particle size of the specific gravity-adjusting material powder between selecting the main weight material and the specific gravity-adjusting material and forming the mixed powder by mixing the specific gravity-adjusting material powder and the main weight material powder.

Advantageous Effects

The balance weight for an electric compressor motor according to an embodiment of the present invention is capable of implementing the required weight by changing the content of the specific gravity and adjusting the size by increasing the specific gravity, thus being advantageous for miniaturization, allowing for improvement in motor design, and expanding the range of applicable devices.

In addition, by using powder metallurgy, the number of processing steps can be reduced and thus economical.

It should be understood that the advantages of the present invention are not limited to the aforesaid but include all advantages that can be inferred from the detailed description of the present invention or the configuration specified in the claims.

MODE FOR INVENTION

Figure 1:
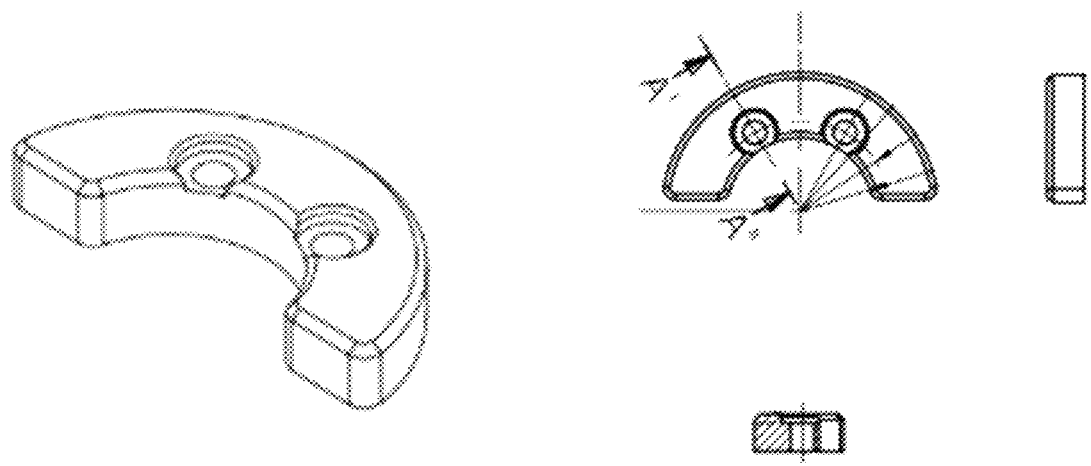
FIG. 1 is a perspective view, a plan view, a front view, and a cross-sectional view taken along line A'-A" of a balance weight for an electric compressor motor according to an embodiment of the present invention.

Hereinafter, the present invention will be described with reference to the accompanying drawings. However, the present invention may be embodied in many different forms and is not limited to the embodiments described herein. In order to clearly describe the present invention, parts irrelevant to the description may be omitted in the drawings, and similar reference numerals may be used for similar components throughout the specification.

Throughout the specification, when a part is said to be "connected (coupled, contacted, or combined)" with another part, this is not only "directly connected", but also "indirectly connected" with another member in between. Also, when a part is said to "comprise" a certain component, this means that other components may be further included instead of excluding other components unless specifically stated otherwise.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

A balance weight for an electric compressor motor according to an embodiment of the present invention will be described.

FIG. 1 is a perspective view, a plan view, a front view, and a cross-sectional view taken along line A'-A" of a balance weight for an electric compressor motor according to an embodiment of the present invention.

Figure 2:
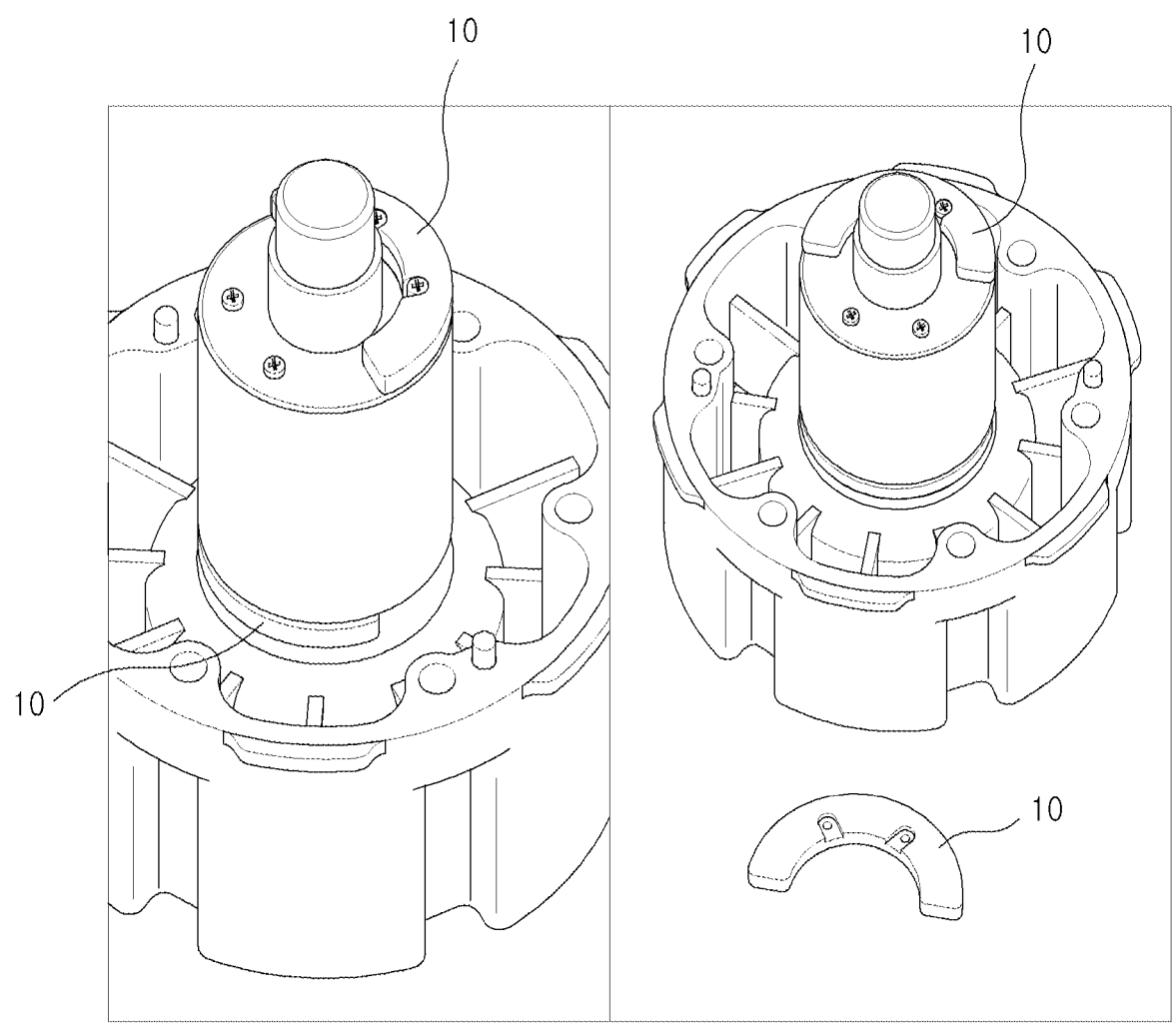
FIG. 2 is an image of a balance weight for an electric compressor motor according to an embodiment of the present invention.

FIG. 2 is an image of a balance weight for an electric compressor motor according to an embodiment of the present invention.

With reference to FIGS. 1 and 2, the balance weight 10 for an electric compressor motor according to an embodiment of the present invention includes a main weight material and a specific gravity-adjusting material.

The main weight material may include brass, pure copper (Cu), or iron (Fe).

The content ratio of zinc and copper of the brass may be, for example, 2:8, but is not limited thereto.

The specific gravity-adjusting material is a material having a higher specific gravity than the main weight material and may include, for example, tungsten (W), molybdenum (Mo) or tungsten carbide (WC).

A target specific gravity may be achieved by adding the specific gravity-adjusting material that increases the specific gravity, adjusting in content, to the main weight material.

For example, the balance weight of the present invention that is composed of the main weight material of brass with a content ratio of zinc (Zn) and copper (Cu) of 2:8 and the specific gravity-adjusting material of tungsten (W) occupying 10 wt % or more in the total weight may have a specific gravity of 8.5 or greater.

In another example, the balance weight of the present invention that is composed of the main weight material of pure copper (Cu) and the specific gravity-adjusting material of tungsten (W) occupying 6.5 wt % or more in the total weight may have a specific gravity of 8.5 or greater.

In another example, the balance weight of the present invention that is composed of the main weight material of iron (Fe) and the specific gravity-adjusting material of tungsten (W) occupying 8.5 wt % or more in the total weight may have a specific gravity of 7.8 or greater.

A method of manufacturing a balance weight for an electric compressor motor according to another embodiment of the present invention will be described.

Figure 3:
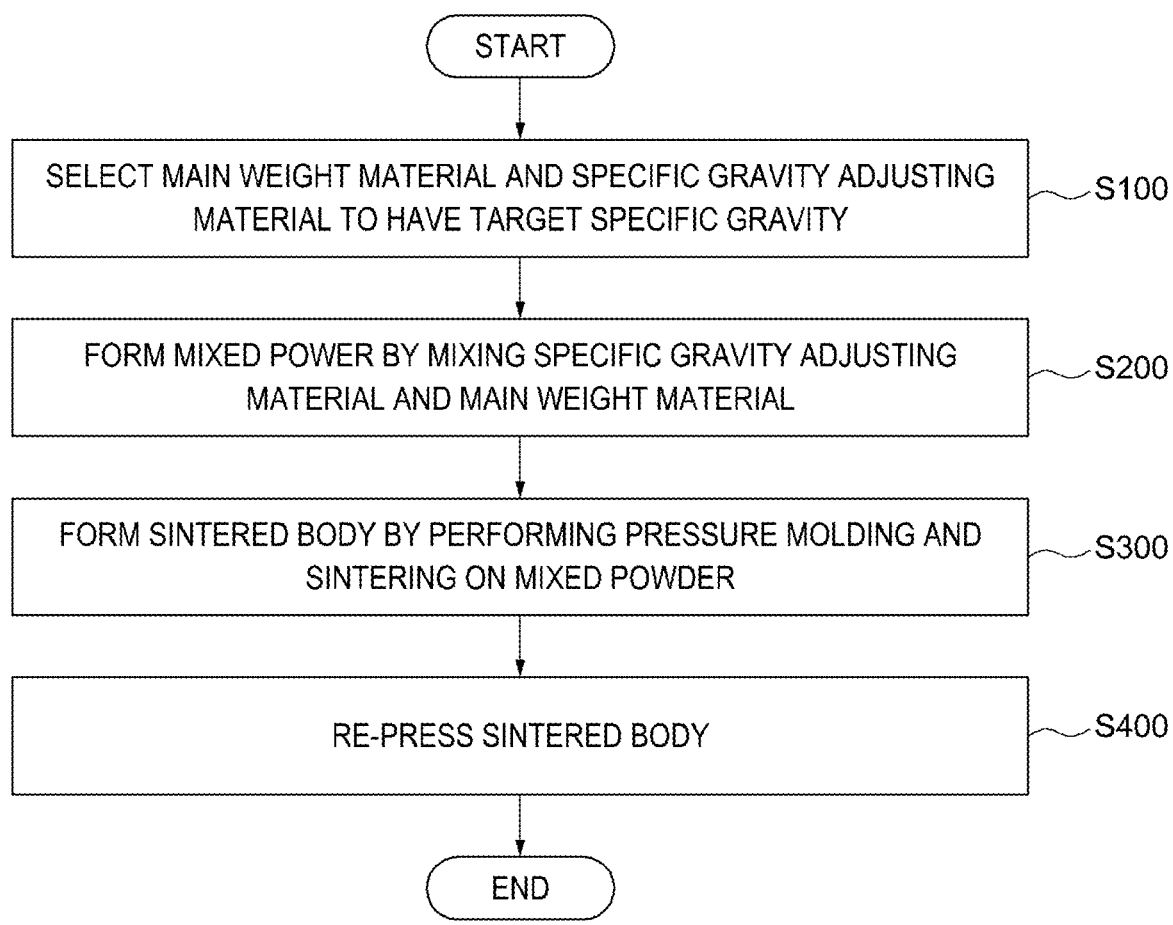
FIG. 3 is a flowchart illustrating a method of manufacturing a balance weight for an electric compressor motor according to an embodiment of the present invention.

FIG. 3 is a flowchart illustrating a method of manufacturing a balance weight for an electric compressor motor according to an embodiment of the present invention.

With reference to FIG. 3, a method of manufacturing a balance weight for an electric compressor motor according to an embodiment of the present invention includes selecting, at step S100, a main weight material and a specific gravity-adjusting material to have a target specific gravity; forming, at step S200, a mixed powder by mixing the specific gravity-adjusting material powder and the main weight material powder; forming, at step S300, a sintered body by performing pressure molding and sintering on the mixed powder; and re-pressing the sintered body at S400.

In the first step S100, the main weight material and the specific gravity-adjusting material are selected to have the target specific gravity.

The main weight material may include brass, pure copper (Cu), or iron (Fe).

The zinc and copper content ratio of the brass may be preferably 2:8, but is not limited thereto.

The specific gravity-adjusting material is a material having a higher specific gravity than the main weight material and may include, for example, tungsten (W), molybdenum (Mo) or tungsten carbide (WC).

When the target specific gravity is set higher than the specific gravity of the main weight material, it is possible to select appropriate main weight material and specific gravity-adjusting material and determine their contents for the target specific gravity.

For example, when the target specific gravity is 8.5 or greater and when the main weight material is brass and the specific gravity-adjusting material is tungsten (W), the content of tungsten may be 10 wt % or more.

In another example, when the target specific gravity is 8.5 or greater and when the main weight material is pure copper (Cu) and the specific gravity-adjusting material is tungsten (W), the content of tungsten may be 6.5 wt % or more.

In another example, when the target specific gravity is 7.8 or greater and when the main weight material is iron (Fe) and the specific gravity-adjusting material is tungsten (W), the content of tungsten may be 8.5 wt % or more.

In the second step S200, the mixed powder is formed by mixing the specific gravity-adjusting material powder and the main weight material powder.

The average particle size of the main weight material powder may be 10 μm to 140 μm.

When the average particle size of the main weight material powder is less than 10 μm or greater than 140 μm, a large weight deviation may occur due to a change in the filling amount of the powder during molding.

In addition, the average particle size of the specific gravity-adjusting material powder may be 10 μm to 100 μm.

When the average particle size of the specific gravity-adjusting material powder is less than 10 μm or greater than 100 μm, a weight deviation may occur due to a change in the filling amount of the powder during molding.

When the average particle size of the specific gravity-adjusting material powder is less than 10 μm, the average particle size may be controlled to be 10 μm to 100 μm through a granulation process to prevent segregation. The granulation process is described again below.

The average particle size difference between the main weight material powder and the specific gravity-adjusting material powder may preferably be 10 μm or less.

Segregation may occur when the difference in average particle size exceeds 10 μm.

Segregation is a phenomenon in which local compositional non-uniformity occurs during the mixing process when two powders having a large difference in specific gravity or in particle size are mixed. Such segregation may be mitigated by reducing the difference in specific gravity or particle size of the mixed powders.

The mixing may be performed using a mixer, for example, a double cone mixer or a V-type mixer by adding 0.5 to 1.0 wt % of a lubricant necessary for the molding process.

The mixing, for example, may be performed for 10 minutes to 1 hour.

In the third step S300, the mixed powder is pressure-molded and then sintered to form a sintered body.

The pressure molding is preferably performed at a pressure of 4 to 12 ton/cm$^2$ for 5 to 12 EA/min, but is not limited thereto.

The sintering is preferably performed at a temperature of 300° C. to 1450° C. for 10 minutes to 2 hours, but is not limited thereto.

For example, when the main weight material is brass and the specific gravity-adjusting material is tungsten (W), brass-tungsten sintered body may be produced by sintering at 600 to 1000° C. for 20 to 40 minutes in an atmosphere containing $N_2$ and $H_2$.

At the fourth step S400, the sintered body may be re-pressed.

For miniaturization of the balance weight, the higher the density is, the more advantageous it is, and the sintered body may contain pores. Therefore, in order to increase the density as much as possible, it is possible to minimize pores by applying pressure as a post-processing.

The re-pressing process may be performed by putting the sintered body in a mold and applying pressure, thereby increasing dimensional accuracy and improving density of the sintered body.

The pressure during the re-pressing is preferably 4 to 12 ton/cm$^2$, but is not limited thereto.

Although less expensive in manufacturing costs than the die casting method, the powder metallurgy method has a disadvantage in that the density is low because it is difficult to obtain a true density. Therefore, in order to compensate for this, an appropriate amount of a specific gravity adjusting substance having a high specific gravity may be added to match or rather greatly increase the specific gravity.

For example, compared to case of using brass forgings, processed products, die castings, etc. with the specific gravity of 8.67 g/cm$^3$, the powder metallurgy method makes it possible to obtain the specific gravity of 8.67 g/cm$^3$ or greater by mixing 90 wt % of brass with 10 wt % of tungsten as a specific gravity-adjusting material and processing the mixture a molding-sintering-re-pressing process. In addition, the specific gravity-adjusting material may further added as needed to reduce the size of the balance weight for advantageous of miniaturization.

In addition, the powder metallurgy method has high productivity, good material utilization rate, and high dimensional accuracy, and it can produce parts close to the final shape, negating the need of the cutting processing greatly.

Additionally, when the average particle size of the specific gravity-adjusting material powder is less than 10 μm, it is possible to add a step of granulating the specific gravity-adjusting material powder between step S100 of selecting the main weight material and the specific gravity-adjusting material and step S200 of forming the mixed powder.

When the average particle size of the specific gravity-adjusting material powder is less than 10 μm, segregation of non-uniform particle distribution may occur in the mixing process, and segregation of particles and weight deviation between products may occur during molding. Therefore, there is a need to perform the granulation in order to increase the average particle size to 10 μm or more.

The granulation may be performed by mixing the specific gravity-adjusting material powder with a slurry material containing a liquid and a binder, and spraying and drying the mixture under hot air conditions.

The liquid may be ethanol or water, but is not limited thereto.

The binder may be polyvinyl butyral (PVB) or polyvinyl alcohol (PVA), but is not limited thereto. The binder function to impart binding force during granulation.

Since the average particle size of the specific gravity-adjusting material powder becomes 10 μm or more by the granulation process, it is possible to prevent the phenomenon of segregation.

Manufacturing Example 1

After setting the target specific gravity to 8.5 or greater, brass with a composition of Cu 80 wt % and Zn 20 wt %, was selected as the main weight material and tungsten (W) was selected as the specific gravity-adjusting material. Next, a brass powder having a particle size of 10 to 140 um was prepared, and a tungsten granular powder having a particle size of 10 to 100 um was prepared by granulating a tungsten powder having a particle size of 2 to 10 um. Next, the brass powder and the tungsten granular powder were prepared in a weight percentage content ratio of 90:10, 0.7 wt % of zinc stearate powder was added as a lubricant, and they were mixed in a double cone mixer for about 10 to 40 minutes. Next, the mixed powder was press-molded at a pressure of 4 to 10 ton/cm$^3$ in a powder automatic molding press, and the molded body was sintered in a reducing atmosphere ($H_2+N_2$ gas) at a temperature of 600 to 900° C. and then re-pressed to produce a brass-tungsten sintered body.

Manufacturing Example 2

A brass-tungsten sintered body of Manufacturing Example 2 was prepared in the same manner as in Manufacturing Example 1, except that the brass powder and the tungsten granular powder were prepared in a weight percentage content ratio of 85:15.

Manufacturing Example 3

After setting the target specific gravity to 8.6 or greater, pure copper was selected as the main weight material, and tungsten (W) was selected as the specific gravity-adjusting material. Next, pure copper powder having a particle size of 10 to 140 um was prepared, and tungsten granular powder having a particle size of 10 to 100 um was prepared by granulating tungsten powder having a particle size of 2 to 10 um. Next, the pure copper powder and the tungsten granular powder were prepared in a weight percentage content ratio of 93.5:6.5, 0.7 wt % of zinc stearate powder was added as a lubricant, and they were mixed in a double cone mixer for about 10 to 40 minutes. Next, the mixed powder was press-molded at a pressure of 4 to 10 ton/cm$^3$ in a powder automatic molding press, and the molded body was sintered at a temperature of 900 to 1080° C. in a reducing atmosphere ($H_2+N_2$ gas) and then re-pressed to produce a pure-tungsten sintered body.

Manufacturing Example 4

A pure copper-tungsten sintered body of Manufacturing Example 4 was prepared in the same manner as in Manufacturing Example 3, except that the pure copper powder and the tungsten granular powder were prepared in a weight percentage content ratio of 85:15.

Manufacturing Example 5

After setting the target specific gravity to 7.8 or higher, iron was selected as the main weight material and tungsten was selected as the specific gravity-adjusting material. Next, iron powder having a particle size of 10 to 140 um was prepared, and tungsten granular powder having a particle size of 10 to 100 um was prepared by granulating tungsten powder having a particle size of 2 to 10 um. Next, the iron powder and the tungsten granular powder were prepared in a weight percentage content ratio of 91.5:8.5, 0.7 wt % of zinc stearate powder was added as a lubricant, and they were mixed in a double cone mixer for about 10 to 40 minutes. Next, the mixed powder was press-molded at a pressure of 4-10 ton/cm$^3$ in a powder automatic molding press, and the molded body was sintered in a reducing atmosphere ($H_2+N_2$ gas) at a temperature of 1100~1400° C. and then re-pressed to produce an iron-tungsten sintered body.

Manufacturing Example 6

A pure copper-tungsten sintered body of Manufacturing Example 6 was prepared in the same manner as in Manufacturing Example 5, except that the iron powder and the tungsten granular powder were prepared in a weight percentage content ratio of 85:15.

Comparative Example 1

Forgings, processed products, or die-casting products made of brass with a zinc-to-copper content ratio of 2:8 were purchased.

Comparative Example 2

Forged products, processed products, and die-casting products made of 100% copper (Cu) were purchased.

Comparative Example 3

Forged products, processed products, and die-cast products made of 100% iron (Fe) were purchased.

Experimental Example

TABLE 1

|  | Density (g/cm$^3$) |  | Density (g/cm$^3$) |
| --- | --- | --- | --- |
| Comparative Example 1 | 8.596 | Manufacturing Example 1 | 8.64 |
|  |  | Manufacturing Example 2 | 9.12 |
| Comparative example 2 | 8.60 | Manufacturing Example 3 | 8.61 |
|  |  | Manufacturing Example 4 | 9.39 |
| Comparative example 3 | 7.87 | Manufacturing Example 5 | 7.90 |
|  |  | Manufacturing Example 6 | 8.56 |

Table 1 shows the measured densities of manufacturing examples and comparative examples. With reference to Table 1, compared to the comparative example prepared without mixing the specific gravity-adjusting material, the density of the manufacturing examples prepared by mixing and sintering the specific gravity-adjusting material was high.

The balance weight for an electric compressor motor according to an embodiment of the present invention is capable of implementing the required weight by changing the content of the specific gravity and adjusting the size by increasing the specific gravity, thus being advantageous for miniaturization, allowing for improvement in motor design, and expanding the range of applicable devices.

In addition, by using powder metallurgy, the number of processing steps can be reduced and thus economical.

The above description of the present invention is for illustrative purposes only, and it will be understood by those skilled in the art that various modifications and changes can be made thereto without departing from the spirit and scope of the invention. Therefore, it should be understood that the embodiments described above are exemplary and not limited in all respects. For example, each component described as a single type may be implemented in a distributed manner, and similarly, components described as distributed may be implemented in a combined form.

The scope of the invention should be determined by the appended claims, and all changes or modifications derived from the meaning and scope of the claims and equivalent concepts thereof should be construed as being included in the scope of the present invention.

DESCRIPTION OF REFERENCE NUMERALS

10: balance weight

The invention claimed is:

1. A balance weight for an electric compressor motor, the balance weight comprising:
   a main weight material; and
   a specific gravity-adjusting material,
   wherein the main weight material is brass and the specific gravity-adjusting material is tungsten (W),
   wherein the balance weight contains the tungsten of 10 weight % or more in a total weight of the balance weight and has a specific gravity of 8.5 or greater, such that a density of the balance weight is 8.5 to 9.12 g/cm$^3$ when the tungsten is 10 to 15 weight % in the total weight of the balance weight.

2. A method of manufacturing a balance weight for an electric compressor motor, the method comprising:
   selecting brass as a main weight material and tungsten (W) as a specific gravity-adjusting material to have a target specific gravity of 8.5 or greater;
   forming a mixed powder by mixing specific gravity-adjusting material powder and main weight material powder;
   forming a sintered body by performing pressure molding and sintering on the mixed powder; and
   re-pressing the sintered body,
   wherein the re-pressing results in the target specific gravity of 8.5 or greater,
   wherein the sintering is performed at a temperature of 600 to 900° C., and
   wherein the re-pressing is performed at a pressure of 4 to 10 ton/cm$^3$.

3. The method of claim 2, wherein, in the forming of the mixed powder, the main weight material powder has an average particle size of 10 μm to 140 μm.

4. The method of claim 2, wherein, in the forming of the mixed powder, the specific gravity-adjusting material powder has an average particle size of 10 μm to 100 μm.

5. The method of claim 2, further comprising, in response to an average particle size of the specific gravity-adjusting material powder being less than 10 μm, granulating the specific gravity-adjusting material powder between the selecting of the main weight material and the specific gravity-adjusting material and the forming of the mixed powder by mixing the specific gravity-adjusting material powder and the main weight material powder.

* * * * *